INVENTOR
JOSÉ URIEL

ATTORNEYS

United States Patent Office 3,578,604
Patented May 11, 1971

3,578,604
PREPARATION OF MIXED GELS OF ACRYLAMIDE AND AGAROSE OR AGAR-AGAR
José Uriel, Paris, France, assignor to Etablissement Public: Centre National de la Recherche Scientifique, Paris, France
Filed Nov. 29, 1966, Ser. No. 597,713
Claims priority, application France, Nov. 30, 1965, 40,338; Oct. 3, 1966, 78,576, 78,578
Int. Cl. B01j 13/00
U.S. Cl. 252—316
8 Claims

ABSTRACT OF THE DISCLOSURE

Mixed gels of acrylamide and a substance selected from the group consisting of agarose and agar-agar, which gels are especially suitable in the electrophoretic separation of natural products as molecular sieves and filters, are prepared by providing heated, buffered solutions of (1) melted agarose or agar-agar, and (2) acrylamide with N,N'-methylene-bisacrylamide, adding ammonium persulfate and N,N',N',-tetramethyl-ethylene diamine to solution (1), rapidly mixing so-treated solution (1) and solution (2), immediately casting the mixture in an oven at a temperature above 50° C., and letting the acrylamide gel form and cool to room temperature.

---

The present invention relates to new and useful mixed acrylamide-agarose or acrylamide-agar-agar gels. The object of the invention is also to provide a process for the preparation of these mixed gels and to point out their various industrial applications, especially in the electrophoretic separation of natural products as molecular sieves and filters.

Acrylamide and agarose gels have been used for a long time is migration supports for the electrophoretic separation of biological substances, or for immuno-chemical analytical methods in gel media, or for other industrial applications. For these various uses, acrylamide gel and agarose gel have respectively various advantages and disadvantages, and one or the other of these gels is employed depending on the treatments that are to be carried out or on the substance to be analyzed.

It is well known that both said acrylamide and agarose gels are transparent and are practically inert. Agarose gel is very easily prepared. The preparation of acrylamide gel is rather delicate, especially because it does not form in the presence of atmospheric oxygen, which requires moulding the gel in special containers or using an apparatus which makes it possible to work in an inert atmosphere; however acrylamide gel has the great advantage of elasticity and electrophoretic resolving power which are very superior in these respects to agarose.

It is evidently desirable to obtain a gel that simultaneously offers the advantageous properties of each of the previously mentioned gels and at the same time avoids or at least decreases their respective disadvantages.

Investigations carried out by the inventor have made it possible to solve this problem and to provide a mixed gel, particularly of acrylamide and agarose satisfying the conditions previously set down above.

Previous teachings indicate that agarose, a natural product derived from agar-agar gels from it aqueous solutions upon simple lowering of the temperature below 40° C. As far as acrylamide is concerned it forms linear polymers through photocatalysis or chemical catalysis that are linked through a three dimensional network of methylene bridges.

It was noted, in the course of the investigations which have led to the present invention, that for acrylamide and agarose, gelation of acrylamide did not occur after the formation of the agarose gel but that a mixed agarose acrylamide gel could be obtained by first gelling acryamide to a temperature above the agarose gelling point and then cooling so as to provoke gelling of the agarose between the acrylamide gel structural units.

The mixed acrylamide-agarose or acrylamide-agar-agar gel in accordance with the invention, therefore consists essentially of a gel with more or less widely separated acrylamide structural units each one of which contains an agarose or agar-agar gel. The porosity of the mixed gels according to the invention, varies, for the same final agarose or agar-agar concentrations, depending on the final acrylamide concentration. In general, the final acrylamide concentration ranges approximately from 3 to 7%.

The mixed gels can be proposed in different forms, either in plates in the hydrated state for immediate use, or in the dehydrated state for later use after rehydration.

From a mechanical point of view, mixed acrylamide-agarose or acrylamide-agar-agar gels are homogeneous, moderately elastic and can be handled easily; they are less rigid thn simple agar-agar or agarose gels which for this reason break easily, but said mixed gels are less than those of acrylamide whose consistency is soft and even gummy and tacky if the acrylamide concentration falls below 5%.

Concerning their physico-chemical properties, the mixed gels, according to the invention, may be impregnated with aqueous solutions of variable acidity and alkalinity ranging from pH 2 to pH 10. Their electrophoretic resolving power for charged molecules, as well as their selective filtration power for substances of different molecular weights is analogous to that of acrylamide gels. Like acrylamide gel, the mixed gels are chemically stable, imperishable and may be kept indefinitely in the cold.

The mixed gels, in addition to the physico-chemical advantages of the acrylamide gels which they preserve add their greater ease of handling due to their consistency and elasticity.

The process of preparation of acrylamide and agarose or agar-agar mixed gels consists basically according to the present invention, in melting the required amounts of agarose or agar-agar on the boiling water bath in a buffer solution adjusted to a pH of about 8.2 consisting of tri-hydroxymethylaminomethane, glycine, boric acid in water, in maintaining this first thus obtained solution at a temperature of approximately 55° C., in preparing a second solution containing the desired quantity of acrylamide with N,N'-methylene-bisacrylamide and with a quantity of said buffer solution approximately equal to the one used with agarose or agar-agar in bringing said second obtained solution to a temperature of approximately 55° C. in adding ammonium persulfate to the first solution as well as a small quantity of N,N,N',N'-tetramethyl-ethylenediamine, in rapidly mixing the first and second solutions, in immediately casting the mixture on a plate in an oven at a temperature above 55° C. and in any case above the agar-agar or agarose gelling temperature, for example 60–65° C., in allowing the time necessary for acrylamide gel formation and in letting the said acrylamide gel cool to room temperature.

Casting is advantageously carried out on a glass support plate placed in a trough whose bottom has the same shape as the plate, in order to facilitate release of the mixed gel.

The time in the oven varies more or less depending on whether the acrylamide concentration is high or low.

In order to accelerate cooling, the trough may be placed in a refrigerator at 4° C.

In order to vary the compactness of the final product, the acrylamide concentration is simply increased; preliminary, tests make it possible to determine, in the laboratory, the acrylamide and/or agarose or agar-agar percentages necessary to obtain a gel of given porosity and to determine the time in the oven. For a same final agarose or agar-agar proportion and by varying the acrylamide proportion, mixed gels of different degrees of porosity may be obtained.

Preliminary tests were carried out in order to determine the optimum conditions for the commercial preparation of mixed gels, i.e. those which insure the required homogeneity and reproducibility. During these tests the mode of variation of the acrylamide polymerisation rate was especially examined; for this purpose, the time between the instant the acrylamide and natural polysaccharide solutions (such as agarose or agar-agar) were mixed and the moment the mixture begins to go from a liquid to a gel state, was measured; this time interval has been termed "pre-gelation time." The homogeneity and the reproducibility from one gel to another were estimated by subjecting gels to electrophoretic separation of the same protein mixture (an enzyme mixture) obtained from the pig pancreas, molecular weight=24,000 and human normal serum, molecular weight between 20,000 and 1,000,000). The action of the following parameters on the acrylamide gelatin rate was studied: temperature, pH acrylamide concentration, salt and ammonium persulfate concentrations. In order to study the respective action of the various parameters, the following standard conditions were set up:

Temperature +50° C.; pH: 7; salt concentration: nil; acrylamide concentration: 5%; agarose concentration: 0.8% (agar-agar concentration 1.2%); ammonium persulfate concentration: 0.3 mg./ml.; N,N,N',N'-tetramethylethylene-diamine: 0.05 ml. per 100 ml. of acrylamide-agarose mixture.

The test results have confirmed that:

(a) increasing the temperature decreases pre-gelation time. The temperature used for the preparation of mixed acrylamide-agarose gels is limited by the necessity of operating at higher temperature than the gelation temperature of agarose. It has been noted that the temperature of +50° C. was the most compatible with a short (2-3 minutes) but sufficient pre-gelatin time so as to allow moulding of the gelling solutions;

(b) the pre-gelation time increases as the pH is further and further removed from neutrality, but the slowing down of gelation which may reach complete inhibition, begins to be significant only beyond pH 8.7 on the alkaline side, and below pH 4 on the acid side;

(c) the shortest pre-gelation time corresponds to the complete absence of salts, the increase in pre-gelation time with respect to the salt concentration becomes appreciable only beyond a salt concentration above 0.3 N. A very high salt concentration may inhibit gelation;

(d) pre-gelation time decreases with increase in acrylamide monomer concentration;

(e) gelation rate increases by a factor of approximately 1.5 with ammonium persulfate concentration until it reaches a maximum from which point on the rate decreases rather abruptly and may even be reduced to zero, i.e. pre-gelation time progressively decreases and then increases. At persulfate concentrations of the order of 8 mg. per ml. of acrylamide-agarose mixture, gelation no longer takes place. Ammonium persulfate concentrations which may be used in practice range from 0.10 to 2 mg./ml. of the acrylamide-agarose mixture. The choice of an adequate persulfate concentration is the most practical means of bringing pre-gelation time within limits, generally 2-3 minutes, that are compatible with the method of gel preparation when the other parameters are changed with respect to the previously mentioned standard conditions.

The invention therefore provides the advantage whereby, in the presence of agar-agar or agarose, gelled acrylamide in an oxygen atmosphere greatly simplifies operations and, in addition, makes it possible to advantageously obtain many types of gel without limitations as to form or dimensions. When it is desired to obtain plates that may be rehydrated, approximately 1% pure glycerin is added to the agarose or agar-agar solution.

Conservation of the gels is appreciably improved by washing immediately following preparation of the gels, which makes it possible to eliminate substances that are not part of gel itself (excess catalyst, oxidation products, polymerization by-products, etc. . . .). Such a washing can be effected in water or in a cold (plus 4° C.) saline solution and is advantageously prolonged for at least six hours.

The gels thus washed and then placed in closed containers keep indefinitely either in cold (+4° C.) aqueous solutions or in 0.5% acetic acid at room temperature.

The invention relates as well to an apparatus which makes it possible to take maximum advantage of the mechanical properties of said mixed gels. It has indeed been noted that the mechanical resistance of these gels was sufficient to allow elimination of the intermediate connections or bridges usually employed between known gels and electrode tanks.

According to the invention it its general form, the extremities of a mixed gel plate are dipped into two electrode tanks, in such a manner that this plate establishes the junction and the continuity of the electric field.

Furthermore, it has been noted that, since the diffusion rate of the solutes inside the mixed gels is slow, the washing becomes difficult flowing, for example, their impregnation with dyes; at least sixteen hours are indeed necessary to remove the colour from a 3 mm. thick gel. Another object of the invention is to provide an apparatus enabling, after an operation, to very appreciably decrease the washing time to approximately one hour; to this effect the mixed gel plates employed may be suspended vertically in a container where they are immersed and cleaned by electrodialysis.

The apparatus according to the invention consists essentially of a reservoir of a separating partition forming two electrode tanks in this reservoir which are filled with a conducting solution, of electrode bearing plates and electrodes, a plate of an appropriate mixed gel being placed on the separating partition so as to dip into one of the tanks through each of its edges, the reservoir being advantageously housed in a box made preferably of transparent plastic material.

The separating partition may be in the shape of a plate, preferably with its edges deflected towards the bottom; this plate is preferably traversed by cooling channels, or other means, for circulation of a cooling agent.

The reservoir and separating partition functioning as a support are made, for example, of polyvinyl chloride.

With this apparatus, there is provided, a washing regenerating device consisting, in a parallelepipedic reservoir, of a suspension rod mounted on the upper part of the reservoir's median longitudinal plane, and, arranged, symmetrically on either side of this axis, respectively, an electrode plate near the partition and a plate perforated with windows over its entire surface, clips fixed on the axis whose function it is to dip mixed gel plates obtained from electrophoresis in the wash liquid filling the reservoir so that a flow of current provokes an electrodialysis whose gas of electrolysis is drained through the plate windows up to an area near the electrode.

Detailed examples for the preparation of mixed acrylamide-agarose gels, containing, finally, various proportions of acrylamide and agarose, are given below.

EXAMPLE 1

(a) The following buffer solution was prepared:

Tris-hydroxymethyl-aminomethane—6 g.
Glycine—15 g.
Boric acid—0.36 g.
$H_2O$—800 ml.

The pH was adjusted to 8.2 with 1 N HCl and the volume was made up to one litre with neutral demineralized water.

(b) 1.4 g. of agarose prepared by the "l'Industrie Biologikue Francaise" Company was melted, on the boiling water bath, into 100 ml. of the above buffer solution (a); the solution was kept on the water bath at a temperature very near 55° C.

(c) The following acrylamide solution was prepared:

Acrylamide (monomer)—5 g.
N,N'-methylene-bisacrylamide—0.13 g.
Above buffer solution (a) q.s.—100 ml.

The acrylamide solution was kept in a water bath at a temperature very near 55° C.

The bisacrylamide and acrylamide used are sold by the Matheson Coleman and Bell Company, Norwood (Cincinnati), Ohio (U.S.A.).

In order to obtain 2 mm. thick plates from the acrylamide and agarose solutions, the following procedure was followed:

Solutions (b) and (c) were prepared before use and may be used whenever they reach the above near 55° C. temperatures. Before preparation of the acrylamide and agarose solutions, a flat-bottomed trough was placed horizontally in a 60–65° C. oven, on the bottom of which was placed a photographic glass plate whose function was to serve as a support for the acrylamide-agarose gel.

Just before mixing the reactants 160 mg. of ammonium persulfate were dissolved in the above agarose reactant b) and 0.12 ml. of N,N,N'N'-tetramethyl-ethylenediamine were added.

The acrylamide and agarose solutions were rapidly mixed for 30–60 seconds and immediately after the mixture was poured into the trough in the oven. After 10–15 minutes the acrylamide gel was formed. The trough was removed from the oven and the entire assembly was allowed to cool at laboratory temperature.

At this point, the agarose was gelled within the structural units of the acrylamide gel. The glass plate covered with the mixed gel was then stripped off.

By using, at the outset, a quantity of agar-agar giving a final proportion of 1% in the mixed gel, and by proceeding as just described, a mixed acrylamide-agar-agar gel was obtained.

EXAMPLE 2

Preparation of a salt-free aqueous gel (5% acrylamide, 0.8% agarose, 3 mm. thick)

The acrylamide and agarose solutions were prepared in neutral demineralized water. The same procedure as above was followed with the reactants and under the following reaction conditions:

Acrylamide 10%; bisacrylamide 0.26%, agarose 1.6%; ammonium persulfate 0.20 mg. per ml. of acrylamide-agarose mixture; N,N,N',N', tetramethyl-ethylene-diamine, 0.05 ml. per 100 ml. of acrylamide-agarose mixture. The solutions were balanced at +50° C.; the pre-gelation time was 2 minutes at +50° C.; the gelation time at +50° C. was 30 minutes.

EXAMPLE 3

Preparation of a gel buffered at pH 8.7 (3% acrylamide, 0.8% agarose, 3 mm. thick)

The following were employed: acrylamide 6%; bisacrylamide 0.26%; agarose 1.6%; the solutions were prepared in a 0.02 M, pH 8.7 Na-veronal HCl buffer. 0.4 mg. of ammonium persulfate were used per ml. of acrylamide-agarose mixture. The remainder of the reactants were identical to those of Example 2. The pre-gelation time at 50° C. was 3–4 minutes. The gelation time at 50° C. was 40 minutes.

EXAMPLE 4

Preparation of a gel that may be rehydrated (5% acrylamide; 0.26% bis-acrylamide; 0.8% agarose or 1.2% agar-agar)

The acrylamide and agarose solutions were prepared in demineralized water containing 3% double-distilled glycerine. The same reactant and reaction conditions were used as those described in Example 2. The gel was cast in a trough, and after stripping the gel was washed at +4° C. for 16–24 hours in an approximately 3% aqueous glycerine solution. The gel was then placed on a glass plate, covered with a thin sheet of a commercially available product named "Cellophane" or with a plastic material; a sheet of filter paper was then applied to the surface of the gel and the entire assembly was allowed to dry in the oven at 37° C. for 16 to 24 hours. After dessication, the assembly, filter paper, dehydrated gel and "Cellophane" sheet, was detached from the support plate.

Dehydrated gels, in this form, keep indefinitely. In order to rehydrate them, the "Cellophane" sheet is simply detached and the remainder is dipped in water or in the buffer solution chosen. After several minutes, the filter paper sheet may also be detached. Rehydration to over 90% of the original gel volume is obtained after 8–16 hours in an aqueous bath. The thus dehydrated gels do not requiring any special precaution for their preservation.

Upon electrophoretic checking of the gels, certain differences were noted between the gel surface that had remained in contact with the glass support plate and the upper surface in contact with the air. It may be supposed that this lack of homogeneity is due to evaporation phenomena during gelation and to a polymerization rate of the acrylamide-agarose mixture which is higher in the absence than in the presence of atmospheric oxygen. In order to correct this drawback, the apparatus according to the invention, is used as described below with reference to the attached drawings in which.

Figure 1:
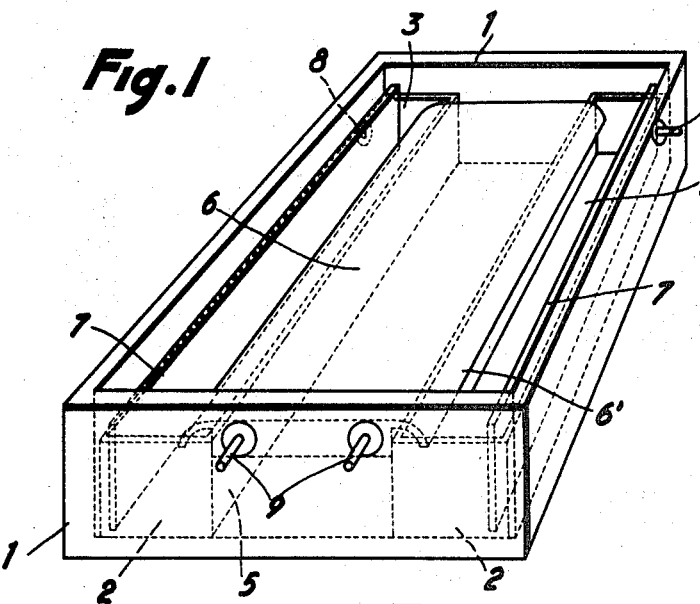
FIG. 1 is a perspective view of the apparatus for electrophoresis with mixed gels.
Figure 2:
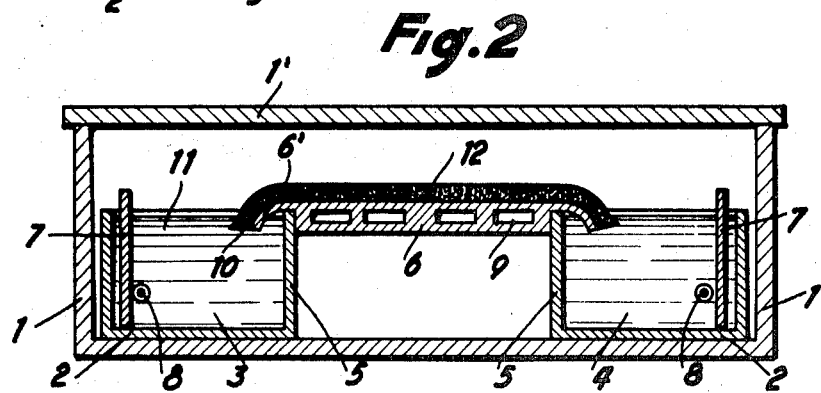
FIG. 2 is a cross-sectional view of the apparatus of FIG. 1.

In the examples of FIGS. 1 and 2, the apparatus consists of an external box 1 made of transparent plastic material with its cover 1', in which lies a polyvinyl chloride reservoir 2. This reservoir is divided into two electrode tanks 3 and 4 by a partition 5 whose horizontal part forms support plate 6 with its edges 6 incurved towards the bottom. In each tank 3 and 4 is placed an electrode bearing plate 7 and the corresponding electrode 8. The horizontal part 6 of the support plate is traversed by cooling channels 9. In order to carry out an operation, a plate 10 of the mixed gel is placed on support plate 6, in accordance with the previously mentioned patent application, for example, whose dropping edges are dipping in a conducting solution 11 used to fill tanks 3 and 4. In order to avoid any evaporation of the liquid impregnating the gel, plate 10 is covered with a thin plastic sheet 12.

Figure 3:
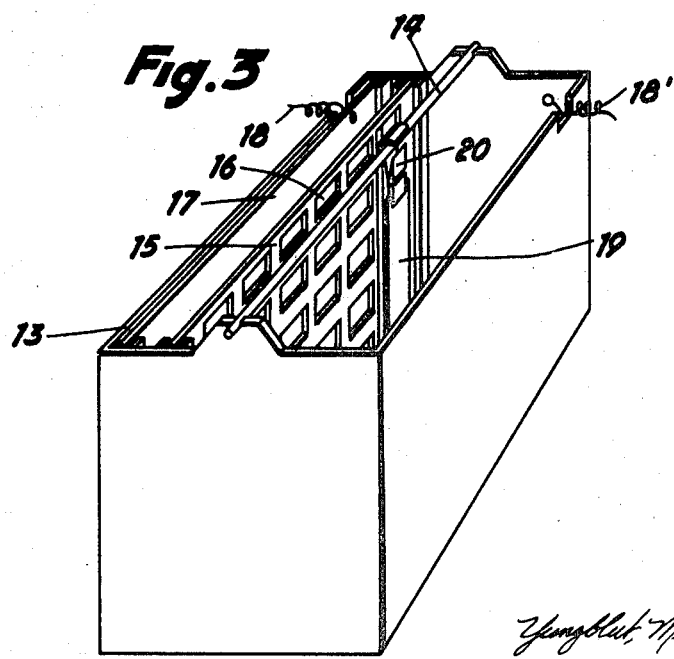
FIG. 3 represents in perspective, a regeneration device, one of the plates which comprises windows being left out for purposes of better clarity.

FIG. 3 shows a regeneration device for mixed gel plates after use. This device comprises a tank 13; a suspension rod 14, is mounted along this tank's large superior median axis. On either side of this rod 14, and symmetrically starting from it, are mounted a vertical plate 15 (15') perforated with window 16 over its entire surface and an electrode plate 17 (17') with its terminals 18 (18').

The mixed gel plate 19, to be regenerated after an operation using the apparatus of FIGS. 1 and 2, is suspended vertically to rod 14 by a clip 20 so as to dip into the wash liquid consisting for example of a 20% methanol solution, 5% acetic acid, 0 to 3% glycerine, and 75 to 77% water. A voltage of approximately 60–70 volts, is applied to terminals 18 (18'). Under these conditions, a mixed acrylamide-agarose gel plate (5% acrylamide and 0.8% agarose) 3 mm. thick is, after having been impregnated with dyes, rendered colorless in approximately 1 hour with the device according to the invention, instead of the 16 necessary hours for the usual washing.

The process that has been described provides mixed gels which appears normally, to be the most usable with final acrylamide concentrations of the order of 3 to 7%, but it will be noted that as a rule there is no limit, other than monomer solubility, for the preparation of mixed gels containing more than 7% acrylamide.

The mixed gels according to the invention may be used very advantageously, among other uses for the electrophoretic separation of natural products, for filtration, or as molecular sieves in 1 to 2 mm. thick films. The invention offers, in addition, the advantage of easily providing sets of dehydrated plates having different properties and porosities which, after an easily carried out rehydration procedure may be used far away from the place of preparation and in accordance with immediate needs.

What is claimed is:

1. A process for the preparation of mixed gels of acrylamide and a substance selected from the group consisting of agarose and agar-agar, comprising the steps which include melting the required proportion of said substance on the boiling water bath in a buffer solution adjusted to a pH of about 8.2, said buffer solution comprising tris-hydroxy-methyl-aminomethane, glycine, and boric acid in water, maintaining said buffer solution at an approximate temperature of 55° C., preparing a second solution of acrylamide with N,N'-methylene-bisacrylamide, such that the acrylamide concentration ranges from about 3% to 7% and the N,N'-methylene-bisacrylamide concentration ranges from about 0.13 to 0.26% of the said mixed gels, and a quantity of said buffer solution which is about equal to that used with said substance, raising said second solution to an approximate temperature of 50° C., adding to said buffer solution ammonium persulfate in amounts between about 0.10 to 2 mg./ml. of said mixed gels and about .05 to about .12/100 ml. of said mixed gels of N,N.N',N'-tetramethyl-ethylene-diamine, rapidly mixing said buffer and second solutions, immediately casting the mixture in the oven at a temperature above 50° C., and letting the acrylamide gel form and cool to room temperature.

2. The process of claim 1, including the step of casting the mixture at a temperature above the agarose or agar-agar gelation temperature.

3. The process of claim 1, including the steps of casting the mixture at an approximate temperature of 55–65° C.

4. The process of claim 1, which uses an ammonium persulfate concentration below .8 mg./ml.

5. The process of claim 1, including the step of adding 1% glycerine to said buffer solution.

6. A process for the preparation of mixed gels of acrylamide and a substance selected from the group consisting of agarose and agar-agar, comprising the steps which include melting the required proportion of said substance on the boiling water bath in a buffer solution adjusted to a pH of about 8.2, said buffer solution comprising tris-hydroxy-methyl-aminomethane, glycine, and boric acid in water, maintaining said buffer solution at an approximate temperature of 55° C., preparing a second solution of acrylamide with N,N'-methylene-bisacrylamide such that the acrylamide concentration ranges from about 3% to 7% and the N,N'-methylene-bisacrylamide concentration ranges from about 0.13 to 0.26% of the said mixed gels, and a quantity of said buffer solution which is about equal to that used with said substance, raising said second solution to an approximate temperature of 50° C., adding to said buffer solution ammonium persulfate in amounts between about 0.10 to 2 mg./ml. of said mixed gels and about .05 to about .12/100 ml. of said mixed gels of N,N,N',N'-tetramethyl-ethylene-diamine, rapidly mixing said buffer and second solutions, immediately casting the mixture in the oven at a temperature above 50° C., letting the acrylamide gel form, and washing the gel at an approximate temperature of 40° C. in a saline solution for at least six hours.

7. A process for the preparation of mixed gels of acrylamide and a substance selected from the group consisting of agarose and agar-agar, comprising the steps which include melting the required proportion of said substance on the boiling water bath in a buffer solution adjusted to a pH of about 8.2, said buffer solution comprising tris-hydroxy-methyl-aminomethane, glycine, and boric acid in water, maintaining said buffer solution at an approximate temperature of 55° C., preparing a second solution of acrylamide with N,N'-methylene-bisacrylamide, such that the acrylamide concentration ranges from about 3% to 7% and the N,N'-methylene-bisacrylamide concentration ranges from about 0.13 to 0.26% of the said mixed gels, and a quantity of said buffer solution which is about equal to that used with said substance, raising said second solution to an approximate temperature of 50° C., adding to said buffer solution ammonium persulfate in amounts between about 0.10 to 2 mg./ml. of said mixed gels and about .05 to about .12/100 ml. of said mixed gels of N,N,N',N'-tetramethyl-ethylene-diamine, rapidly mixing said buffer and second solutions, immediately casting the mixture in the oven at a temperature about 50° C., letting the acrylamide gel form, and keeping the cold gel in a closed vessel containing an aqueous solution of 0.5% acetic acid, at room temperature.

8. A process according to claim 1, in which the mixture is cast on a glass foil to form a sheet thereon, the sheet of gel obtained from the casting is washed in an approximately 3% aqueous glycerine solution, then placed on a glass plate covered with a "Cellophane" sheet where the gel is covered with a sheet of filter paper, dried and the assembly "Cellophane," dehydrated gel and filter paper is detached from the glass plate.

References Cited
UNITED STATES PATENTS

| 3,046,201 | 7/1962 | White et al. | 252—316X |
| 3,168,500 | 2/1965 | Suen et al. | 260—78.5X |
| 3,281,409 | 10/1966 | Blethen | 260—209 |

RICHARD D. LOVERING, Primary Examiner

U.S. Cl. X.R.

106—208; 195—100; 204—299; 210—31